Feb. 11, 1969  K. J. AVERSTEN  3,427,468
PROTECTIVE GROUND ARRANGEMENT FOR CONTACT LINE POLES
Filed March 1, 1965

INVENTOR
KARL JOEL AVERSTEN
BY *Larson and Taylor*
ATTORNEYS

United States Patent Office 3,427,468
Patented Feb. 11, 1969

3,427,468
PROTECTIVE GROUND ARRANGEMENT FOR CONTACT LINE POLES
Karl J. Aversten, Lidingo, Sweden, assignor to AGA Aktiebolag, Lidingo, Sweden, a corporation of Sweden
Filed Mar. 1, 1965, Ser. No. 436,063
Claims priority, application Sweden, Mar. 3, 1964, 2,579/64
U.S. Cl. 307—94    3 Claims
Int. Cl. H02h 9/04; H01b 7/28

ABSTRACT OF THE DISCLOSURE

A protective grounding arrangement for a contact line pole of an electric railway is provided wherein a voltage-dependent resistor is inserted between the pole and a rail. The resistor comprises series-connected dry-plate rectifying elements of opposite polarities, the resistance of the resistor being a high value within a range of voltages extending from zero to the maximum voltage caused by the return current flowing through the rail during normal operating conditions, and being of a low value for voltages higher than the maximum voltage.

---

The present invention relates to a protective ground arrangement for contact line poles of electric railways.

Up to now it has been customary to arrange a protective ground for the contact line poles primarily to prevent them from assuming a voltage which may be dangerous to man, for instance owing to the occurrence of a leak between the feeder and the pole. Normally, such protective ground is provided by connecting the pole with the rail by means of a conductor, so that there is no possibility for a dangerous voltage to exist between the pole and the rail.

However, the return current flowing through the rail in normal operation always creates a voltage drop in the rail. It follows that, if a direct connection of the type referred to is present between the pole and the rail, a voltage differential will be created between the pole and the zero terminal of the rectifier station. Consequently, a current will flow from the rail via the poles and through the ground to the ground terminal of the rectifier station. This current follows paths of least resistance in the ground, which may for instance be telephone cables, electric power cables, water conduits or sewers. The result of this is an electrolytic transfer of materials which causes the conduits to corrode and makes costly repairs necessary. It is apparent from this that a direct connection between the rail and the contact line poles is suitable only in so far as it prevents the poles from reaching voltages dangerous to man but that such direct connection is otherwise disadvantageous.

This disadvantage is obviated according to the present invention by inserting in the conductor connecting the rail with a contact line pole a voltage-dependent resistor having a resistance characteristic providing a high value of resistance causing the pole to be insulated from the rail in normal operation when the voltage differential between the pole and the rail is not higher than that caused by the voltage drop in the rail owing to the return current therethrough, the value of resistance being low when a substantially higher voltage differential occurs between the pole and the rail, for instance owing to a flashover between the contact line and the pole, whereby in such case a direct connection is established between the pole and the rail. Preferably, the voltage-dependent resistor comprises a valve unit composed of series-connected dry rectifying elements having conductivities of mutually opposed directions.

The invention is described in more detail below with reference to the attached drawing, FIG. 1 of which shows schematically a valve unit of the type referred to mounted on a contact line pole and connected to a rail. FIG. 2 shows on an enlarged scale a section through the valve unit.

Figure 1:
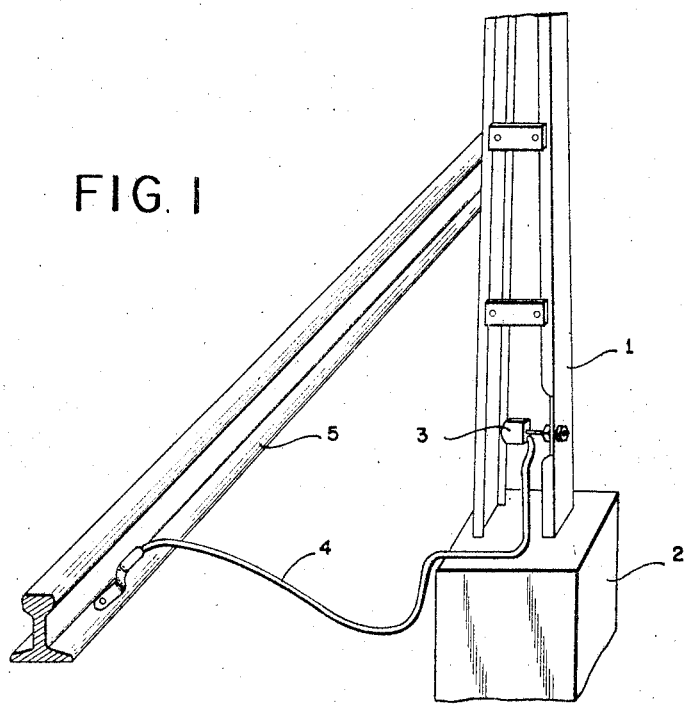
Figure 2:
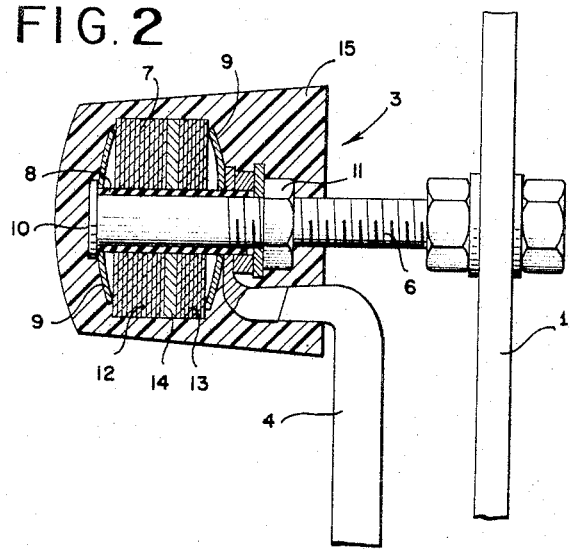

As is apparent from FIG. 1, which shows the lower portion of a contact line pole 1 with its base 2, a valve unit 3 is mounted on the pole and connected by means of a conductor 4 with a rail 5 schematically shown on the drawing.

It is seen from FIG. 2 that the valve unit 3 is attached to the pole 1 by means of a bolt 6 and nuts providing good metallic contact between the pole 1 and the bolt 6. Mounted on the free end of the bolt are a number of dry-plate rectifying elements 7 which are insulated from the bolt 6 by means of a tube 8 of insulating material. The rectifying elements are furthermore compressed between a flange 10 and a nut 11 by means of interposed resilient washers 9. A cable shoe connected to the conductor 4 is also held compressed between the nut 11 and one of the resilient washers 9, the other washer 9 being directly connected to the flange 10. In this manner the conductor 4 will be connected to the pole 1 through the series-connected rectifying elements of the valve unit 3.

The rectifying elements 7 are divided into two groups 12 and 13 being conductive in opposite directions and separated by a contact washer 14.

The rectifying elements are preferably of such construction and the number thereof so chosen that the back voltage in each direction is of the order of some hundreds of volts, which means that in normal operation, when there is present between the rail and the contact line pole only a voltage drop resulting from the flow of return current in the rail, there is effective insulation between the pole and the rail, since the voltage drop referred to is below the back voltage of the valve unit. In consequence, there is no risk of the return current finding its way to the contact line pole and from it through the ground back to the zero terminal of the rectifier station. In this manner, the risk of a corrosion of conduits that are laid down underground in the vicinity of the rail track is entirely excluded.

Should a flashover occur, such as from the feeder to the contact line pole, there will be a voltage differential between the pole and the rail of the order of 1600 volts, i.e., a voltage differential substantially higher than the back voltage of the valve unit. This leads to a breakdown of the rectifying elements and makes the resistance of the valve unit drop to a low value and practically establishes a direct connection between the contact line pole and the rail. The result of this is that the pole cannot assume a voltage dangerous to man.

In the embodiment of the invention shown on the drawing, the rectifying elements are cast into a transparent, insulating and weatherproof plastic 15, the primary object of which is to allow the valve unit to be mounted as indicated on the drawing, i.e., openly and without any outer cover, which contributes to keeping down the cost of the arrangement. Furthermore, the plastic is assumed to be of such a kind as to become opaque (crackled) upon a breakdown of the valve unit. This makes it possible to ascertain during an inspection of the valve units mounted on the contact line poles along the track whether these are still fully operative or if some valve unit has been destroyed by a flashover or the like.

What is claimed is:

1. Protective grounding arrangement for a contact line pole of an electric railway comprising a voltage-dependent resistor included in a conductive connection between the pole and a rail, said resistor comprising series-connected dry-plate rectifying elements of opposite polarities, the resistance of said resistor having a high value providing substantially complete insulation of said pole from said rail within a range of low voltages extending from zero and including the maximum voltage caused by the return current flowing through said rail during normal operating conditions, and having a substantially lower value within a range of voltages higher than said maximum voltage.

2. An arrangement as claimed in claim 1, in which one stack of elements of one polarity is in series with a stack of elements of the opposite polarity.

3. An arrangement as claimed in claim 1, in which said resistor is cast in a transparent plastic constituting means for indicating the operability of the grounding arrangement by becoming opaque upon a breakdown of said rectifying elements.

References Cited

UNITED STATES PATENTS 1,927,894 9/1933 Krause _____ 338—21
3,096,496 7/1963 Burrage _____ 338—21

FOREIGN PATENTS 38,857 8/1936 Netherlands.
588,838 11/1933 Germany.

ROBERT K. SCHAEFER, Primary Examiner.

DAVID SMITH, JR., Assistant Examiner.

U.S. Cl. X.R.

307—95; 204—196